United States Patent [19]
Partridge, III

[11] Patent Number: 5,933,484
[45] Date of Patent: Aug. 3, 1999

[54] METHOD FOR PROVIDING A MENU TO A SUBSCRIBER ON A SWITCHED COMMUNICATIONS NETWORK

[75] Inventor: B. Waring Partridge, III, Far Hills, N.J.

[73] Assignee: AT&T Corp, Middletown, N.J.

[21] Appl. No.: 08/768,065

[22] Filed: Dec. 16, 1996

[51] Int. Cl.$^6$ .................................................. H04M 3/42
[52] U.S. Cl. ...................................... 379/201; 379/93.25
[58] Field of Search .................................. 379/201, 207, 379/93.17, 93.23, 355, 386, 93.25

[56] References Cited

U.S. PATENT DOCUMENTS

| | | | |
|---|---|---|---|
| 5,402,477 | 3/1995 | McMahan et al. | 379/201 |
| 5,414,754 | 5/1995 | Pugh et al. | 379/67 |
| 5,544,236 | 8/1996 | Andruska et al. | 379/201 |
| 5,592,546 | 1/1997 | Takahashi | 379/355 |
| 5,615,257 | 3/1997 | Pezzullo et al. | 379/201 |
| 5,774,671 | 6/1998 | Satoh | 379/93.25 |

OTHER PUBLICATIONS

E. Nussbaum, "Voice Storage in the Network—Perspective and History," *The Bell System Technical Journal*, vol. 61, No. 5, May–Jun. 1982, pp. 811–819.

*Primary Examiner*—Daniel S. Hunter

[57] ABSTRACT

A method for providing a menu to a subscriber on a switched telecommunications network is provided. In a first step, a menu of service options is provided to a subscriber. The menu includes a menu modification option. In a second step, a service request code corresponding to one of the service options is received from the subscriber. And, in a third step, the corresponding service option is provided to the subscriber.

21 Claims, 3 Drawing Sheets

METHOD FOR PROVIDING A MENU TO A SUBSCRIBER ON A SWITCHED COMMUNICATIONS NETWORK

FIELD OF THE INVENTION

This invention relates to switched communications networks, and more particularly, to switched communications networks in which subscribers on such networks are quickly provided access to a variety of services, including enhanced services.

BACKGROUND OF THE INVENTION

One example of a known switched communications network is the public switched telephone network ("PSTN"). In that network, individual subscriber lines are connected to a local end office switch that is capable of connecting one subscriber to another subscriber or to a trunk line that connects to another switch.

Tandem switches ("tandems") are switching systems that switch between switching systems, such as end offices or other tandems. Local tandems provide connections between end offices for local calls in the same Local Access and Transport Areas ("LATAs"). Direct trunk lines also provide connections between switching systems, and in particular may provide connections between two end offices in the same LATA.

Access tandems provide entry points into a LATA for an interexchange provider ("IXP"). An IXP is any carrier which is authorized to provide service on an interLATA basis (i.e., a "toll call"). Two access tandems and an IXP provide a connection between two end offices for toll calls in different LATAs. At least one access tandem is used to obtain access to IXP services and at least two access tandems are used to provide interLATA connections.

In order for the switching network to properly place a call (i.e., establish a communication path between two subscribers), that call must contain a call code, including an origination code and a destination code. As used herein, the term "code" refers to one or more signals for conveying information originating in a first location and destined for a second location, that contain voice or data content to be transferred from the first location to the second location, and optionally data that control how the voice or data content is transferred. An origination code usually includes the identification number of the caller ("caller ID"). As used herein, an abbreviated code is any code that must be translated in order for a switch or server to properly handle that call. The caller ID may be used locally by a Local Exchange Carrier or an IXP for (1) routing the call to a selected IXP, (2) connecting to one or more desired services, such as voice mail and other enhanced information services on the switched network, and (3) billing the caller. A destination code usually includes the identification number of the called subscriber. The call code may also include other additional information such as control information that may provide auxiliary functions, such as restricting a call from being placed to certain destinations.

Common protocols used to convey call codes include dial pulsing (i.e., for use with a rotatory telephone), dual-tone multi frequency ("DTMF") pulsing (i.e., for use with push-button phones), and multi frequency pulsing (i.e., for use with trunk lines).

A disadvantage of conventional methods for providing access to network services is that the requesting subscriber is inconvenienced by the relatively large number of digits required to place one or more calls. Therefore, it would be desirable to provide a method for providing network services on a switched communications network that expedites switching between network services provided by the same or different IXPs.

Another disadvantage of conventional methods for providing access to network services is that access to those services is not rapid, particularly to enhanced services. Enhanced services are services which may be provided to a subscriber without the normally expensive high bandwidth connections that are usually required for real-time voice transmission. For example, when a subscriber wishes to switch between different network services, that subscriber may be required to hang-up and redial the entire new destination code, especially when the desired new service is provided by a different IXP. Redialing is slow, inconvenient to the caller, and wastes valuable access tandem resources because it requires that the caller terminate and reinitiate communication paths between the caller and the IXP for each subsequent call. Therefore, it would be desirable to provide expedited services to subscribers who wish to switch between network services on any particular IXP.

SUMMARY OF THE INVENTION

It is an object of the present invention to provide a method for expediting subscriber access to services offered by a single IXP and for expediting switching between network services.

In accordance with this invention, there is provided a method for expediting access to network services during communication between two subscribers over a communication path on a switched communication network. The method includes the steps of: (1) detecting in the network injection of a DTMF service request signal by one of the subscribers, and (2) providing a service to that subscriber corresponding to that signal from a set of services including a service for terminating said communication path to said second subscriber.

Also in accordance with this invention, there is provided a method for providing a menu to a subscriber on a switched telecommunications network. That method includes the steps of: (1) providing a menu of service options to a subscriber comprising a menu modification option, (2) receiving from that subscriber a service request code corresponding to one of the service options, and (3) providing one of the service options to that subscriber.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

The present invention provides to subscribers on a switched network expedited access to network services. The description that follows is set in the context of the public switched telephone network, but the principles of the invention are applicable to any type of switched network.

Figure 1:
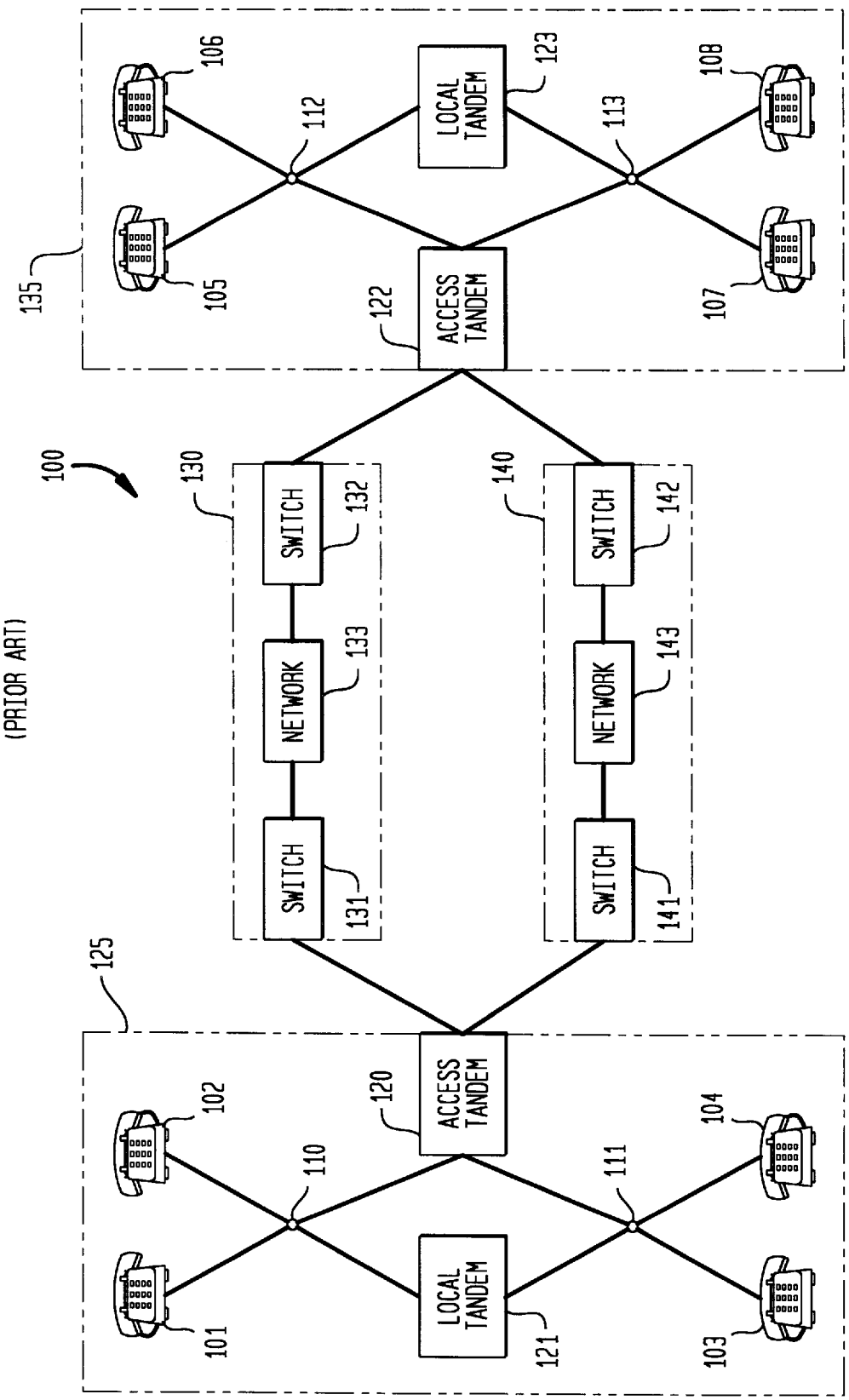
FIG. 1 is a schematic representation of a known telephone network configuration for illustrating a known method of completing a call.

A known telephone network architecture is shown in FIG. 1. Network 100 includes an end office switches 110, 111, 112, and 113 to which many subscribers 101 and 102, 103 and 104, 105 and 106, and 107 and 108 are connected, as shown. The term "connection" as used herein, refers to any physical, electrical, optical, or wireless connection between any two points in switched communication network 100, including any of the plurality of subscribers, any intervening switches and/or trunks between switches. End office switches 110 and 111 are coupled to access tandem 120, and optionally further connected by local tandem 121. Similarly, end office switches 112 and 113 are coupled to access tandem 122, and optionally further connected by local tandem 123.

According to present day regulations in the United States, access tandems 120 and 122 may be used in a conventional switched network to place toll calls by providing access to any of IXPs 130 and 140. For example, IXP 130 has two switches 131 and 132 for coupling to access tandems 120 and 122, respectively. Similarly, IXP 140 has two switches 141 and 142 for connecting access tandems 120 and 122, respectively. In conventional switched network 100, United States regulations require that toll calls, that is calls placed between subscribers in different LATAs (e.g., between subscriber 101 in LATA 125 and subscriber 105 in LATA 135), be routed through access tandems 120 and 122.

As used herein, network services include any service that may be provided to subscribers on network 100 including, but not limited to, real-time voice transmission, analog and digital data transmission, and various enhanced services, including messaging, financial transactions, directory assistance, etc. Enhanced services may be provided by any server located at any destination on network 100, including service providers.

In accordance with the present invention, a method for providing access to network services during communication between two subscribers over a communication path on a switched communications network, such as network 100, is provided. The term "communication path" as used herein refers to any one or combination of connections that provide communication between any two points in switched communication network 100, including communication between subscribers, any switches and/or trunks between switches.

Figure 2:
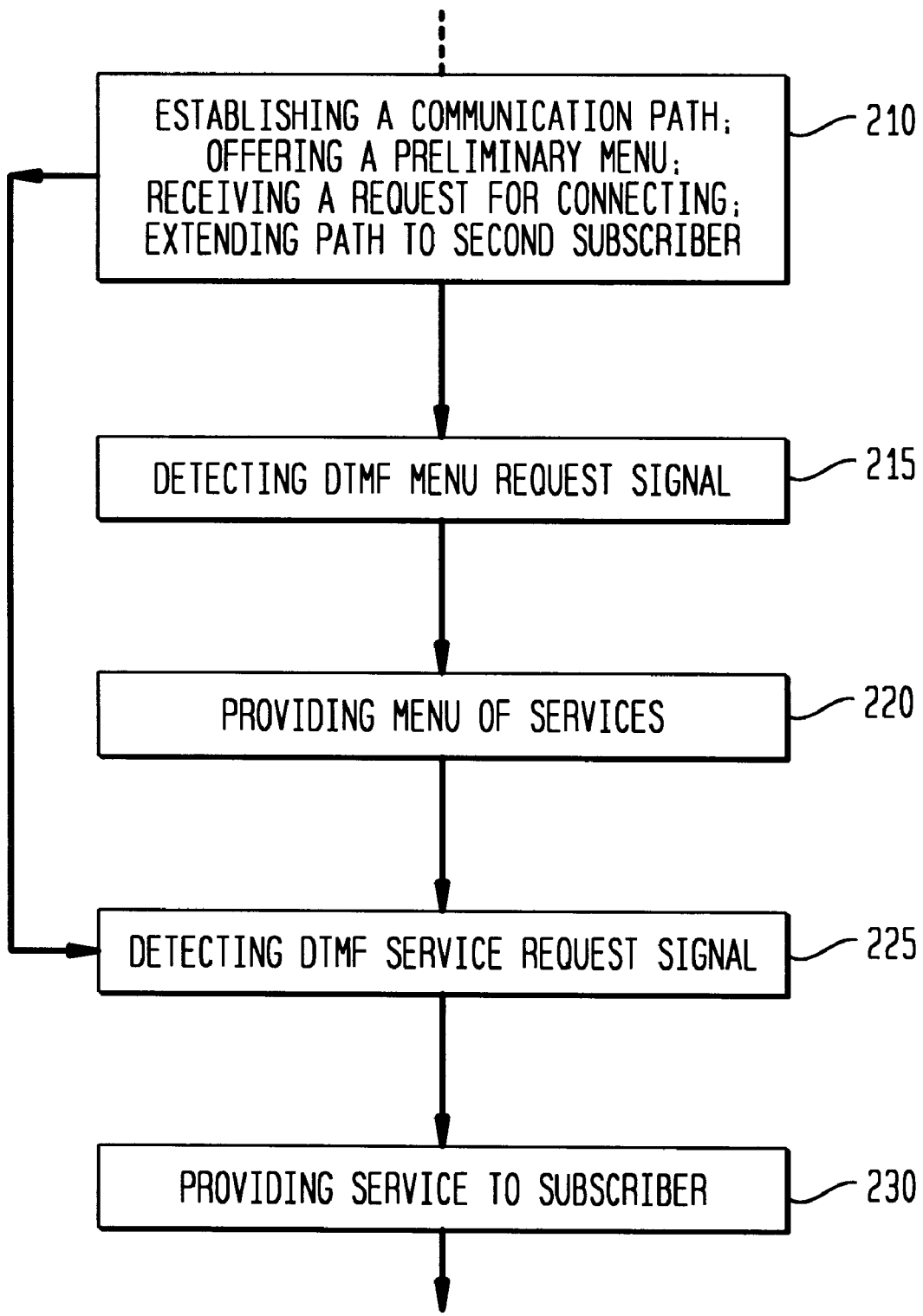
FIG. 2 is a flow diagram illustrating an embodiment of the method according to the present invention.

FIG. 2 is a flow diagram that illustrates a method according to the present invention.

In order for a communication path to be established between two subscribers, a connection must be available between them. As described above, the connection may be any physical, electrical, optical, or wireless connection. Normally, the connection is terminated at each subscriber with a terminal end unit, which may be any unit capable of translating information conveyed on the network to a subscriber. Typical end units are telephones, facsimiles, screen phones, and computers of any kind.

Next, a communication path must be established between the connected subscribers. A communication path may be established in a variety ways, but is usually accomplished by one subscriber calling another. Of course, communication paths that connect more than two subscribers are also possible (i.e., conference calls).

One way in which a communication path may be established between two subscribers is shown in FIG. 2 in step 210. First, a communication path is established between a first subscriber and an adjunct. As used herein, an adjunct is any intermediate device in a network capable of routing or directing a call from the adjunct to another point on the network, including another adjunct, or subscriber. Second, a preliminary menu is offered to the first subscriber that includes a service for connecting the first subscriber to the second subscriber. The preliminary menu could be a visual menu provided on a screen, a voice-based instruction set, or any other conventional means for presenting information to a subscriber. The menu may be customized to the subscriber, either by the subscriber himself or by a network service provider, such as an IXP or another subscriber. Preferably, the customized menu (or a customized menu profile which can be used to create a customized menu) is stored in a database with a subscriber identification code for subsequent retrieval by the provider of the menu. Third, a request for connecting the first subscriber to a second subscriber is received from the first subscriber. And forth, the communication path is extended from the first subscriber and the adjunct to the second subscriber. Naturally, these steps can be performed repeatedly in order to establish a communication path in which more than two subscribers are capable of communicating with each other at one time.

Once a communication path is established between at least two subscribers, any of the participating subscribers may request a menu by injection of a DTMF service request signal onto the network. After such a signal is injected in the network, a two-step process may be performed. First, in a step 215, the DTMF menu request signal is detected by the first subscriber. The DTMF signal may be detected by any conventional detector. Optionally, the detector is capable of identifying which of the subscribers requested the menu. Second, in a step 220, a menu of at least one service is provided to the subscriber in response to the menu request signal. As already discussed above, the menu may, for example, be visually or audibly provided to the subscriber.

Any of the participating subscribers may request that a menu be provided to them for access to further network services, however, it should be clear to one of ordinary skill in the art that the menu need not be provided to the subscriber in order for that subscriber to access network services.

After a communication path has been established, any participating subscriber may be provided with one or more network services. In a step 225, the injection of a DTMF service request signal by a first subscriber is detected by a DTMF detector. Once such a signal is detected, then, in a step 230, a service is provided to that subscriber corresponding to the DTMF service request signal injected. The requested service may be any network service available on the network, including a service for terminating the communication path between the first and second subscribers. Steps 225 and 230 may be performed before or after the second subscriber is on-hook. Also, each of these steps may be repeated any number of times in order to gain access to any number of corresponding services. Such services may include, for example, ordinary voice telephone calls or voice-band data call to an online data service such as an Internet service provider. Optionally, the set of network services also includes at least IXP access (i.e., transmitting analog or digital data on at least one part of an IXP), IXP switching (i.e., changing IXPs), and messaging (i.e., transmittal and retrieval of messages).

A communication path between subscribers may be established when the call code, which is associated with the call, is sufficient to identify a particular destination. For example, end office 110 may be programmed to recognize that when origination 101 is in an "off-hook" state, a communication path between subscribers 101 and 105 should be established. Alternatively, the call code may be sufficient when the caller at origination 101 dials an abbreviated IXP code, as long as end office switch 110 is capable of recognizing and utilizing that abbreviated IXP code.

Figure 3:
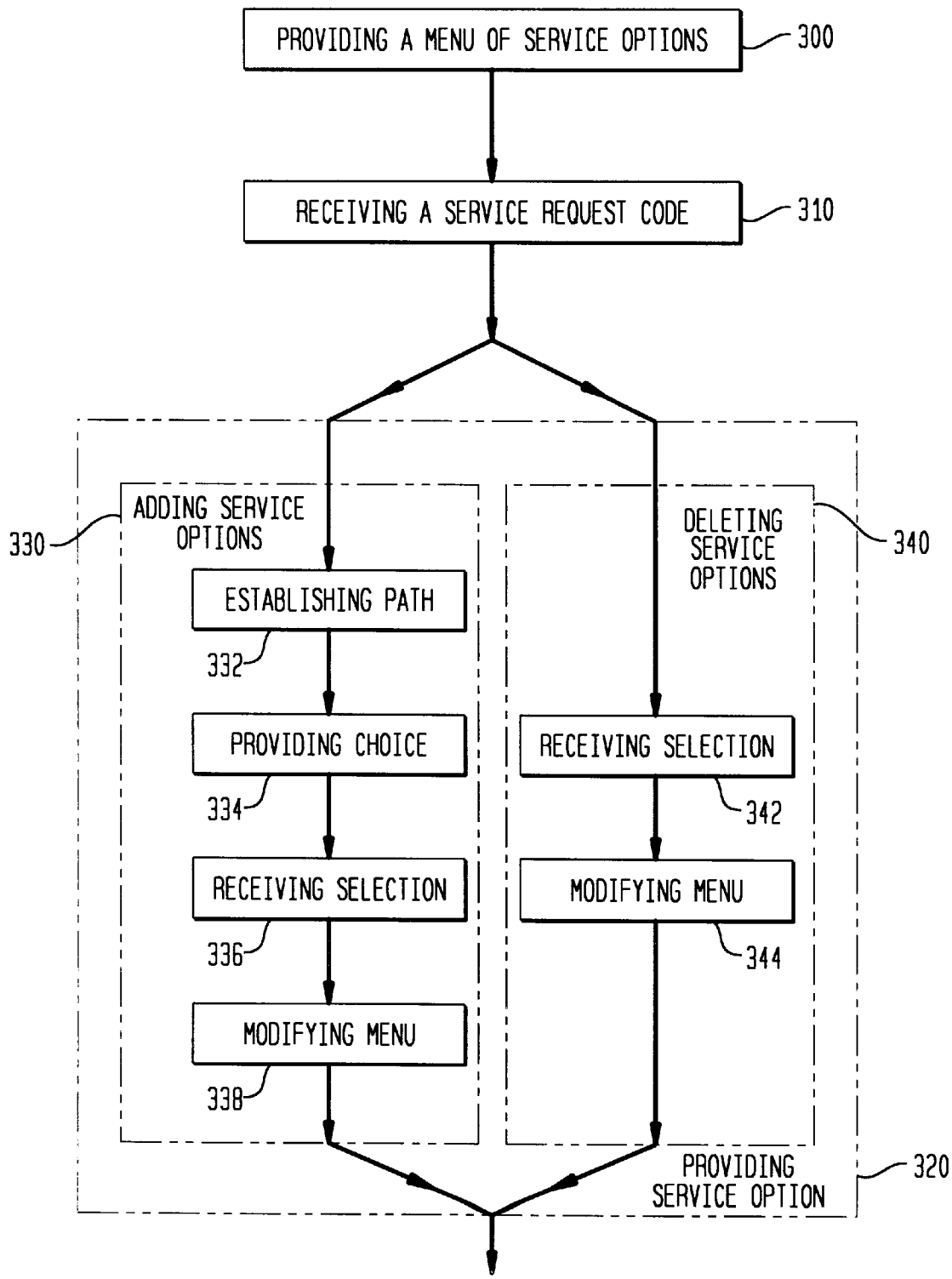
FIG. 3 is a flow diagram illustrating another embodiment of the method according to the present invention.

FIG. 3 is a flow diagram that illustrates another method of the present invention. The method provides a menu to a subscriber on a switched telecommunications network and includes, in a first step 300, providing a menu of service options to a subscriber wherein the menu includes a menu modification option, in a second step 310, receiving from the subscriber a service request code that corresponds to at least one of the listed options, and, in a third step 320, providing to the subscriber a service option that corresponds to the request code received.

The menu provided in step 300 may include a call completion option for establishing a communication path between the subscriber and a destination. Then, when a service request code from the subscriber that corresponds to the above-identified call completion code is received, a communication path established. The service request code may be a DTMF signal, but may generally be any transmittable code, including video, audio, or any other combination of electrical and/or optical signals.

Step 300 may also include the step of including a marker in the menu that corresponds to one or more destinations. The marker indicates to the subscriber the communication capability of the corresponding destination(s). For example, a marker may distinguish between destinations offering plain old telephone service ("POTS") and enhanced services. The markers described herein assist the subscriber in choosing service options. One way in which the subscriber may be assisted is the power of the subscriber to catagorize destinations based on distinguishing communication characteristics. By grouping all of the destinations that offer enhanced services together (e.g., at one location on a visual display), a subscriber may quickly scan those destinations for the particular one which meets that subscriber's needs. In this way, a subscriber is provided expedited access to particular network services that could otherwise take substantial time to locate.

Markers, in accordance with the principles of the present invention, may also distinguish between (1) real time and non-real time transmission services, (2) voice and data communication services, and (3) broad and narrow band transmission services. The markers may be presented to the subscriber in a number of ways including, for example, visual and audible icons.

As already discussed above, step 300 provides a menu of service options that includes a menu modification option. When the menu modification option is selected by the subscriber, the menu is modified, in step 320, after a request code that corresponds to the menu modification option is received during step 310. The menu modification option allows customization of the menu itself by the subscriber. The modification option may, for example, include adding, in a step 330, or deleting, in a step 340, service options from the menu, which of course may be nested. It may also allow for customization of the arrangement of the options on the menu itself.

The step of adding service options may include: in a step 332, establishing a communication path between the subscriber and a repository of service options; in a step 334, providing a choice of service options to the subscriber; in a step of 336, receiving a selection of a service options from the subscriber; and in a step 338, modifying the menu to include the options selected by the subscriber. The repository of service options may be stored in a local or remote database. A remote database is preferred to a local database because it allows that database to be regularly updated and provides around the clock availability of the database to the subscriber regardless of the subscribers access point. Preferably, step 334 provides the subscriber with the ability to browse through the repository of service options to make one or more selections. Also, step 334 may provide a plurality of telephone numbers stored in at least one database.

The step of deleting service options may include, in a step 342, receiving a selection of one or more service options from the subscriber and, in a step 344, modifying the menu to exclude the selected service options. One of ordinary skill in the art will appreciate that the steps of deleting and adding service options may be performed repeatedly in any combination or order.

The menu provided in step 300 may be a nested menu hierarchy, including at least a primary menu having one or more subscriber-selectable elements, which when selected, provides to the subscriber at least one more menus. Also, the subscriber may provide any other subscriber on the communication path continued access to network services, even after the first subscriber terminates the path between himself and the other subscriber.

Moreover, the menu provided in step 300 may include subscriber-selectable network services which have either been previously accessed by the subscriber, preselected by the subscriber, and/or included in the menu based on subscriber-specific information, including demographic information. Demographic information includes certain statistical characteristics, such as age or income of the subscriber, that may be useful to network service providers. As used herein, a preselected network service is one which the subscriber has selected to be on the menu, before the menu is actually provided to the subscriber. Previously accessed network services include those services which the subscriber has already accessed in previous calls, and especially those which the subscriber has already accessed a number of times. Network services may be categorized appropriately so that if certain services are used or preselected by the subscriber, network services in the same category may also be offered to the subscriber. In this way, the menu may be continually updated and customized to provide to the subscriber expedited access to potentially relevant network services.

While the invention has been described in connection with a telephone network, it is applicable to any switched communications network in which subscribers wish expedited services on a network.

Thus it is seen that methods of providing access to network services during communication between subscribers and a menu to a subscriber on a network, have been provided. One skilled in the art will appreciate that the present invention can be practiced by other than the described embodiments, which are presented for purposes of illustration and not of limitation, and the present invention is limited only by the claims which follow.

What is claimed is:

1. A method for providing a menu to a subscriber on a switched telecommunications network comprising the steps of:

providing a menu of service options to said subscriber, in the course of establishing a communication path between said subscriber and another subscriber or in the course of communication after establishing the communication path;

receiving from said subscriber a service request code corresponding to one of said service options; and providing said one of said service options to said subscriber.

2. The method of claim 1 wherein said menu further comprises a call completion option with respect to said communication between said subscriber and said another subscriber, that affects capabilities of said communication, and said step of providing said one of said service options comprises establishing a communication path between said subscriber and said another subscriber in response to a receiving a service request code from said subscriber that corresponds to said call completion option.

3. A method for providing a menu to a subscriber on a switched telecommunications network comprising the steps of:

providing a menu of service options to said subscriber comprising a menu modification option, and an option of a call completion to a destination;

receiving from said subscriber a service request code corresponding to one of said service options; and providing said one of said service options to said subscriber including, with reference to said call completion option, establishing a communication path between said subscriber and said destination in response to a receiving a service request code from said subscriber corresponding to said call completion option; where said step of providing a menu further comprises including in said menu a marker corresponding to said destination characterizing a communication capability of said destination.

4. The method of claim 3 wherein said step of including comprises:

including a marker that distinguishes said destination between a POTS service and an enhanced service.

5. The method of claim 3 wherein said step of including comprises:

including a marker that distinguishes between a real time transmission service and a non-real time transmission service.

6. The method of claim 3 wherein said step of including comprises:

including a marker that distinguishes between a voice communication service and a data communication service.

7. The method of claim 3 wherein said step of including comprises:

including a marker that distinguishes between a broad band transmission service and a narrow band transmission service.

8. The method of claim 1 wherein said step of providing said menu comprises:

providing said menu visually to said subscriber.

9. The method of claim 3 wherein said step of including said marker comprises:

including a visual icon.

10. The method of claim 1 wherein said step of providing said one of said service options comprises:

modifying said menu service options after a request code corresponding to said menu modification option is received during said step of receiving.

11. The method of claim 10 wherein said step of modifying comprises:

adding a service option to said menu.

12. The method of claim 11 wherein said step of adding comprises the steps of:

establishing a communication path between said subscriber and a repository of service options;

providing a choice of service options to said subscriber;

receiving a selection of a service options from said subscriber; and modifying said menu to include said selected service options.

13. The method of claim 12 wherein said step of providing a choice to said subscriber comprises:

providing an option to browse through said repository.

14. The method of claim 12 wherein said step of providing a choice comprises:

providing a plurality of telephone numbers stored in at least one database.

15. The method of claim 10 wherein said step of modifying comprises:

deleting a service option from said menu.

16. The method of claim 15 wherein said step of deleting comprises the steps of:

receiving a selection of one or more of said service options from said subscriber; and modifying said menu to exclude said selection of service options.

17. The method of claim 1 wherein said step of providing a menu comprises:

providing a nested menu.

18. The method of claim 1 wherein said step of providing a menu comprises:

providing a menu including a selection of service options, said selection being based on demographic information pertaining to said subscriber.

19. The method of claim 1 wherein said step of providing a menu further comprises:

providing a menu of service options including establishing a communication path to a destination corresponding to a destination that a communication path has previously been established by said subscriber.

20. The method of claim 1 wherein said step of providing a menu further comprises:

providing a menu of service options including establishing a communication path to a destination corresponding to a destination that a communication path has frequently been established by said subscriber.

21. The method of claim 20 further comprising:

before said step of providing a menu, selecting destinations to be included in said menu in response to a calling history of said subscriber.

* * * * *